Nov. 25, 1958 J. E. CARPENTER 2,861,281
APPARATUS FOR SIMULTANEOUSLY THREADING A PLURALITY
OF RODS AND SEQUENTIALLY RELEASING THE RODS
FROM ROTARY WORK HOLDERS
Filed June 13, 1955 2 Sheets-Sheet 1
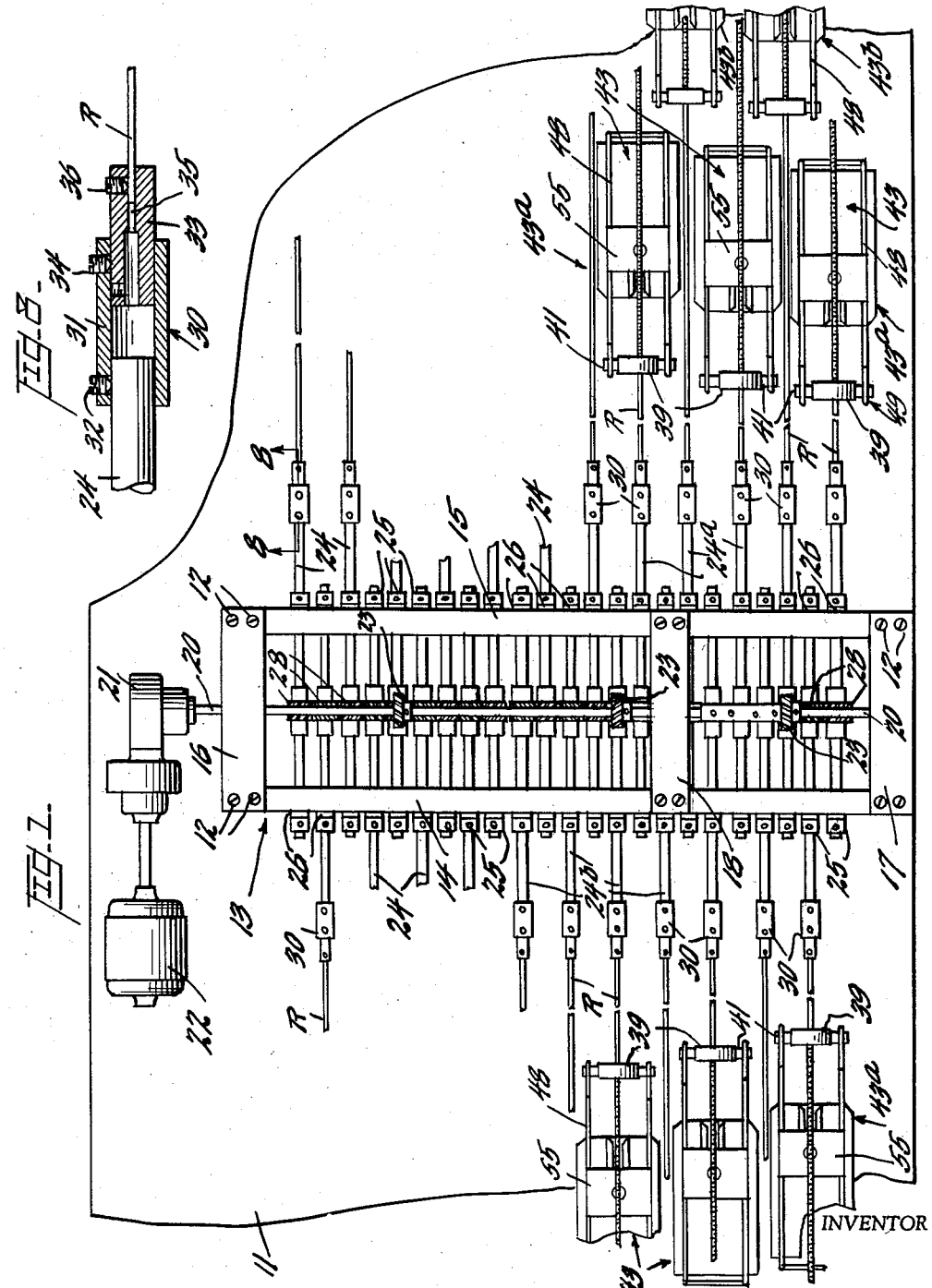
INVENTOR
James E. Carpenter
BY Watson, Cole, Grindle & Watson
ATTORNEYS

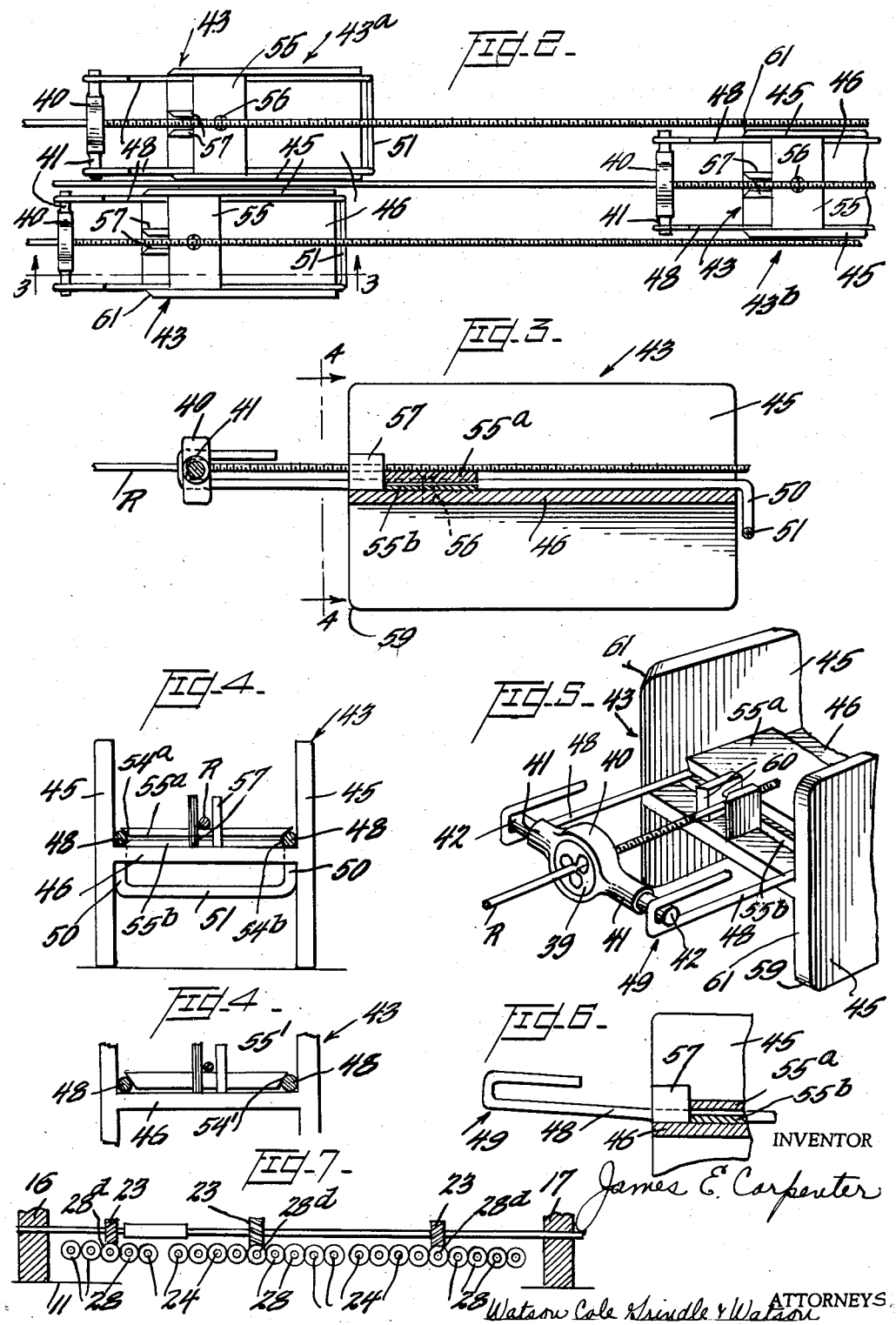

United States Patent Office 2,861,281
Patented Nov. 25, 1958

2,861,281

APPARATUS FOR SIMULTANEOUSLY THREADING A PLURALITY OF RODS AND SEQUENTIALLY RELEASING THE RODS FROM ROTARY WORK HOLDERS

James E. Carpenter, Gaithersburg, Md.

Application June 13, 1955, Serial No. 514,956

2 Claims. (Cl. 10—91)

This invention relates to thread-cutting machines and is directed more particularly to an apparatus of the semi-automatic variety that is adapted for threading lengthy rods or dowels.

There may be found in the prior art a multitude of thread-cutting machines embodying a wide variety of principles of operation. Almost without exception, however, if these machines are of durable construction and capable of a high rate of production, they are quite complex in their design and mode of functioning and, consequently, are extremely expensive to construct or purchase. On the other hand, if such a machine can be acquired with a reasonable outlay of capital, its construction is unsubstantial and its output prohibitively small.

It is, therefore, the principal object of this invention to provide a machine for cutting threads on rods or dowels which is simple in design and unusually inexpensive to construct but is nevertheless capable of a sustained high rate of production.

A further object of the invention is to provide a machine especially designed for the threading of relatively long rods, dowels, or the like, that functions semi-automatically, requiring the services of an operator or attendant only at the initiation of the thread-cutting operation, the actual cutting of the thread and the release of the threaded object from the machine being thereafter performed without human intervention.

Additional objects and advantages will be apparent from the following detailed description when read in connection with the accompanying drawings, in which Figure 1 is a partial plan view, looking down on a machine embodying the principles of the present invention;

Figure 2 is an enlarged detailed view in plan of several of the die-supporting slides, illustrating the arrangement of the slides in groups and showing the staggered relationship of the slides in each group;

Figure 3 is an enlarged cross-sectional view taken along line 3—3 of Figure 2;

Figure 4 is a front elevation of the slide taken along line 4—4 of Figure 3;

Figure 5 is a fragmentary perspective view of the front portion of the slide, showing the thread-cutting die in operative position;

Figure 6 is an enlarged detailed view of a portion of Figure 3 with the die removed;

Figure 7 is a transverse cross-sectional view of the entire machine taken substantially along the line 7—7 of Figure 1 and showing the drive components of the machine; and Figure 8 is an enlarged longitudinal sectional view taken along line 8—8 of Figure 1 showing the chuck for releasably connecting the individual spindles to the rods to be threaded.

Broadly speaking, the machine of the present invention includes a generally longitudinal horizontal plane surface upon which is mounted a plurality of rotatable spindles arranged in spaced parallel relationship with their axes above and parallel to the plane of the supporting surface. At one end, each of the spindles is provided with a chuck which is adapted to releasably engage one end of the rods or dowels that are to be threaded. The other end of each of the rods is inserted in a thread-cutting die, which upon rotation of the rod progressively advances along the length of the rod toward the spindle, forming threads on the rod, the die being supported for such movement by a slide resting upon the surface and freely movable thereover. The slides also support the rods at the level of the spindle and are adapted to track on the rods during the threaded operation to advance the dies along a rectilinear path in a proper cutting relationship with the rod. Preferably, the spindles are disposed at a substantially central point on the supporting surface with the rod-engaging chucks being carried by opposite ends of alternate spindles in order that threading of a plurality of rods may proceed simultaneously in two directions.

Turning now to a description of the drawings, in Figure 1 the numeral 11 generally indicates a flat, generally horizontally disposed surface, such as the top of a table, platform, or the like, which surface is ordinarily of a considerably greater length than breadth. Rigidly mounted upon surface 11, as by means of bolts 12, is a rectangular frame generally designated 13, consisting of cross members 14 and 15, extending substantially across the entire width of surface 11, and end members 16 and 17 connecting the cross members together. As will be seen shortly, frame 13 should be of strong, relatively massive construction and may be braced at suitable points along its greatest dimension by tie members 18. Journaled in end members 16 and 17 for rotation about its individual axis is a main drive shaft 20 which extends transversely of the longitudinal axis of surface 11, being connected at one end to the output side of a gear reduction unit 21 driven by means of a prime mover 22, such as an electric motor or the like. At each of a plurality of points along its length, shaft 20 carries a worm or spiral drive gear 23.

Journaled in cross members 14 and 15 is a plurality of spindles 24 arranged in spaced relationship with their longitudinal axes above and parallel to the plane of surface 11, the spindles being held against axial movement with respect to frame 13 by means of locking sleeves 25 and washers 26. At one end, each of spindles 24 projects exteriorly of frame 13 and, for the most effective utilization of space, it is preferred that every other one of spindles 24 projects in an opposite direction from the immediately adjacent spindles, giving in effect two series of spindles, each extending from the center of surface 11 towards one of its ends, and for the purpose of distinction, the spindles in these two groups will be designated 24a and 24b, respectively. All of spindles 24 are rotated by gears 23 mounted on shaft 20, the driving arrangement being best shown in Figure 7. For the purpose of localizing the damage that might result if any spindle were accidentally held against rotation, it is desirable that the spindles be divided, for driving purposes, into gangs, which may comprise any desired number less than the total number of spindles, all of the spindles in any one gang being driven from a single drive gear. This may be accomplished by providing a gear 28 on each of the spindles, all of the gears 28 in any one gang being in meshing engagement, with one of the gears of the gang, e. g., 28d, being in driven engagement with drive gear 23. By virtue of this arrangement, the single driven gear 28d in any one gang will rotate in one direction, the two gears immediately adjacent to it will rotate in another direction, the next adjacent gears will rotate in the same direction as the driven gear and so on. This sequence is particularly important where the spindles are disposed in two oppositely facing series, with alternate gears in one series and the remaining gears in the other series, in order that all of the gears in each series will rotate in the same direction. To maintain this sequence, it may be necessary to select a different driven gear in some of the groups than in others or to reverse the hand of the gear in some of the groups, the latter arrangement being preferable since it permits the center gear to be driven in all groups, balancing the driving strain. Although the spindles in each series rotate oppositely, the ultimate direction of the threads on all rods will be the same since the threading progresses in opposite directions in the two series.

To connect the end of each of the spindles 24 that is remote from frame 13 to the rod to be threaded, a chuck 30 (Figure 8) is utilized. This chuck may take the form of a sleeve 31, fitting over the end of spindle 24 and secured thereto by means of a set screw 32, and a collet 33 inserted in the other end of sleeve 31 and tightly held in place by a set screw 34, collet 33 having an axial bore 35 therein for the reception of one end of the rod R that is to be threaded. One of the features of this invention is that the rod R is automatically released from chuck 30 when the threading operation is essentially completed and dis-engagement of rod R may be effected in any one of a number of ways. One particularly simple and effective way of releasing rod R is by providing in collet 33 a set screw 36 which, when the threading operation is initiated, is tightened up just the extent necessary to withstand the ordinary resistance encountered during threading but which will permit the rod to slide out of the bore 35 of collet 33 when an abnormal axial force tending to separate the two occurs. Preferably, the angle of taper of the point of said screw 35 is selected so as to facilitate this release and it has been found that angle of taper of 45° or more with the axis of the screw is advantageous for this purpose. Should the machine be commonly employed for threading two different sizes of rods, the size of bore 35 in one-half of collet 33 may be selected to accommodate the smaller rod while the size of the remaining half may be selected to accommodate the larger rod, a radial threaded socket for the set screw being provided for each half.

For the purpose of forming threads on rods R, there is provided for each rod a thread-cutting die 39 mounted within a holder consisting of a socket 40 having diametrically opposed trunnions 41. The end portions of trunnions 41 are reduced in cross-section as at 42. Dies 39 and their holders are adapted to travel over substantially the entire length of the rods, and to hold the dies against rotation during this movement a supporting slide, generally designated 43, is utilized. As can be seen from Figures 3–5, slide 43 consists of two spaced parallel upstanding rectangular plates 45, resting upon surface 11 along the lower edge thereof, which are connected at approximately their mid-points by a horizontal web 46, being thus generally U-shaped in the cross-section. Preferably, the slides are constructed of heavy metal, such as cast iron or steel, although other materials may be used, if desired.

The dimensions between the outer surfaces of upstanding plates 45 should be slightly in excess of the length of the die holder and may be in the order of six inches or so, the greater the width commensurate with the total width of the surface 11 and the number of rods that is to be threaded, the greater the amount of stability possessed by the slides in their movement on surface 11. Resting upon the upper surface of horizontal web 46 adjacent its connection with upstanding plates 45 are two spaced legs 48 of a bracket or bail 49 formed of heavy wire or the like, legs 48 being bent downwardly at their rearward extremity, as at 50, to engage the rear edge of web 46, and being connected together at the rear by a transverse bridging portion 51. At their front end, legs 48 project forwardly of the front edge of web 46 and are bent rearwardly to provide two spaced parallel hooks, which are adapted to hold the reduced portions 42 of trunnions 41 and prevent forward movement of die 39 relative to slide 43. Bail 49 is held in place on web 46 by means of opposed clamping plates 55a, 55b fastened to web 46 by one or more screws 56 and having their lateral edges beveled, as at 54a, 54b to hold legs 48 against both lateral and vertical movement. An alternative arrangement for clamping legs 48 is illustrated in Figure 4A, in which the two plates 55a, 55b are replaced by a single superposed plate 55' having a thickness approximately equal to the combined thickness of plates 55a, 55b, the lateral edges of plate 55' being beveled at 54'. To align slides 43 and the dies carried thereby with respect to the corresponding rods R, two vertically directed lugs 57 are welded to web 46 on either side of its transverse mid-point, the lugs being spaced apart slightly more than the thickness of the rod in order that the rod may extend therebetween. Smooth travel of the slides 43 over surface 11 through the cuttings or chips that accumulate on the surface is facilitated by rounding the lower forward corner of upstanding plates 45, as at 59. The height of thread-cutting die 39 above surface 11 may be adjusted to bring the dies into horizontal alignment with spindles 24 by bending the legs 48 of bail 49 in an appropriate direction.

To cause the ends of rods R to be automatically directed into the slot between lugs 57 during the initial phase of the threading, the forward edges of lugs 57 are beveled inwardly as at 60. Where the rods associated with each series of spindles are threaded in two stages, as later described, with all of the rods in the second stage, except extreme outside rods, passing between the upstanding side plates 45 of two closely adjacent slides in the first stage, the passage of the end of the rods in the second stage between the side plates will be facilitated by providing an outward bevel on the forward edge of the plates, as at 61. The bevel on both plates 45 and lugs 57 prevents the advancing slides from becoming lodged against the ends of inactive rods, which may be slightly out of alignment, as the rod ends are thereby guided into proper position for passage between the plates or lugs, as the case may be.

At the beginning of the threading operation, the operator inserts one end of each of rods R just slightly into the aperture of a collet 33 and tightens up on the set screw 35 to the necessary extent. He then places the other end of the rod in the thread-cutting die to begin the formation of thread. Thereafter, continued rotation of rod R by spindles 24 causes the dies, their holders, and the supporting slides to move progressively forward toward frame 13 without further attention by the operator until the front face of a die contacts the outer face of collet 33. Further rotation of rod R exerts an axial pull on the rod sufficient to overcome the resistance of set screw 36 and draw the rod out of the bore 35 of the collet. The threaded rod and the slide associated therewith may be then removed by the operator, a new rod inserted into the available spindle, and another threading operation begun. If a number of dies were to contact the collets at the same time, the strain on the machine necessary to withdraw the rods from the grip of set screws 35 might very well be great enough to cause damage to the driving components. Accordingly, it is advantageous during the threading operation for the dies to be staggered slightly on their respective rods so that the rod bearing the die first to make contact with the corresponding collet is completely removed from the collet before the next die makes contact with its collet and so on. This arrangement will also give the operator time to complete the threading of one position of the machine before it becomes necessary to thread up another position and he is not confronted with the task of hurriedly threading up a number of positions all at once. It may be said that this staggered sequence will normally result since a previously threaded rod will be well on its way by the time a further rod can be completely threaded up.

In order to increase the production of a machine embodying the principles of the present invention and occupying a given amount of floor space, it is contemplated that the dies and their respective supporting slides will be run in two or more stages on surface 11 on both sides of frame 13 and this technique is indicated in Figures 1 and 2 with the slides in the first stage being designated 43a and in the second stage 43b. To permit the practice of this technique, the axes of the spindles in each of the series 24a and 24b are spaced apart somewhat more than one-half of the width of a slide. In threading up, the rods rotated by every other spindle of each series is associated with a slide, which slides constitute one stage, e. g., stage a, and, while these rods are being threaded, the remaining rods can be associated with the other slides which constitute the second stage. The threading operation of each side of surface 11 thus proceeds in the two stages with the dies and slides in one stage preceding the dies and slides in the other stage. The dies and slides in the first stage complete their traverse and withdrawal of their respective rods and are removed from surface 11 by the operator before the slides of the second stage approach the vicinity of the spindles so that the slides in the first stage do not interfere with the advance to completion of the second stage. The spacing between rods permits those rods leading to the second stage of dies and slides to fit between two adjacent slides in the first stage without disturbing the alignment and travel of the slides in the first stage. The distance between stages will be largely a matter of individual preference although the over-all length of the slides and dies will be an important factor. It is desirable that this distance be such that the last slide in the first stage will have finished its traverse before the first slide in the second stage completes its movement over the surface. It will be understood that as each rod is threaded and withdrawn from its collet, that rod and its associated die and slide are removed from the machine, a new rod is placed in position and the die and slide started on the new rod. The over-all operation therefore proceeds continuously; as the slides in the first stage finish one by one, the second stage becomes the first stage and the slides that were previously in the first stage are used one by one to make up a new second stage.

In most cases, slides 43 move smoothly and steadily over surface 11 without tipping or upsetting. Where particularly heavy rods are being threaded, however, some tendency to tip over may be exhibited by the extreme outside slide of each stage in the direction of threading, that is, the outside slide to the right when threading direction is clockwise and the outside slide to the left when the threading direction is counter-clockwise. Should this tendency be encountered, it may be readily overcome by temporarily connecting the outside slide to the next adjacent slide in the particular stage as, for instance, by means of a rigid strap of metal or other material inserted in the hooks of the bails of these two slides rearwardly of the die holders. With this arrangement, the two connected slides work as a team, the inner slide affording added stability and increased resistance to tipping to the outer slide. Except for the outside slide in the direction of threading, the slides, being relatively closely spaced together, tend to support one another against tipping during the threading operation. The slides, while moving, travel in an essentially rectilinear path and have little tendency to deviate from this path due to the fact that they are guided along the rods by lugs 57 and are automatically aligned with the spindle axis as a result of rotation of the rod.

The inherent resiliency of the bails 49 is advantageous since the bails are thus capable of absorbing most of the shock occurring when threading is initiated and when the rods are disengaged, thereby relieving the strain on the dies and the driving components during these periods. The extent to which the bails are unsupported at their forward portion may be varied to eliminate any possibility of permanent deformation thereof by merely adjusting the longitudinal position of the bails with respect to slides 43.

It will be appreciated, of course, that any variations and modifications may be made in the details of design, construction, and operation of the invention. For example, the dies and slides may be run in three or more stages on each side of surface 11, in only one stage, or may be run in one, two, three or more stages on only one side of surface 11; the changes in the disposition of driving components necessary for these arrangements will be immediately apparent. In is therefore, not intended that the practice of the invention should be restricted to the particular embodiment that has been illustrated and described, but only by the scope of the claims hereunto appended.

Having thus described the invention, that which is claimed is:

1. Apparatus for threading rods, dowels and the like which comprises a planar supporting surface, a plurality of rotatable spindles mounted in spaced relationship with their axes substantially parallel to the plane of said surface and to each other, drive means common to all of said spindles for rotating the same, a coupling connecting one end of a rod to each of said spindles, which coupling is adapted to release the rod when an abnormal resistance to rotation of the rods is encountered, a die for threading each of said rods, said dies being staggered along the lengths of the rods during the threading operation and means supporting said dies for longitudinal movement along the surface but preventing rotation thereof, said rods being released sequentially when the dies encounter the coupling due to the resultant increase in resistance to the rods to rotation above that of normal threading.

2. The apparatus of claim 1 wherein said supporting means for each die comprises a slide having spaced apart legs which rest on the planar surface and means intermediate said legs for engaging the rod during the threading operation to align the die with the rod, said slide having a width such that it passes in close proximity to those rods which are adjacent the rod engaged thereby, the forward side edges of said legs being beveled rearwardly and outwardly to guide the slide between the adjacent rods.

References Cited in the file of this patent

UNITED STATES PATENTS

| | | |
|---|---|---|
| 1,506,331 | Benko | Aug. 26, 1924 |
| 2,056,053 | Moore | Sept. 29, 1936 |

FOREIGN PATENTS

| | | |
|---|---|---|
| 500,696 | France | Mar. 20, 1920 |
| 556,681 | Great Britain | Oct. 15, 1943 |
| 991,522 | France | Oct. 8, 1951 |